United States Patent
Söderberg et al.

(10) Patent No.: US 7,069,495 B2
(45) Date of Patent: Jun. 27, 2006

(54) BIT ERROR RESILIENCE FOR AN INTERNET PROTOCOL STACK

(75) Inventors: Johan Söderberg, Hägersten (SE); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 933 days.

(21) Appl. No.: 09/802,698

(22) Filed: Mar. 9, 2001

(65) Prior Publication Data

US 2002/0071432 A1 Jun. 13, 2002

Related U.S. Application Data

(60) Provisional application No. 60/244,369, filed on Oct. 30, 2000.

(51) Int. Cl.
*G01R 31/28* (2006.01)
*G08C 25/00* (2006.01)

(52) U.S. Cl. ............ 714/776; 714/799; 382/232; 370/389

(58) Field of Classification Search ............ 714/758, 714/776, 799; 382/232; 370/389
See application file for complete search history.

(56) References Cited

U.S. PATENT DOCUMENTS

| | | | |
|---|---|---|---|
| 5,535,199 A | | 7/1996 | Amri et al. |
| 6,608,841 B1 * | | 8/2003 | Koodli ............ 370/474 |
| 6,711,164 B1 * | | 3/2004 | Le et al. ............ 370/392 |
| 6,721,333 B1 * | | 4/2004 | Milton et al. ............ 370/469 |

FOREIGN PATENT DOCUMENTS

| | | |
|---|---|---|
| WO | 95/30282 A1 | 11/1995 |
| WO | 99/04522 A1 | 1/1999 |
| WO | 00/42743 A2 | 7/2000 |

OTHER PUBLICATIONS

W. Simpson, Internet Engineering Task Force (IETF) RFC 1662, "PPP in HDLC-like Framing", Jul. 1994, http://www.cis.ohio-state.edu/rfc/.rfc1662.txt.

(Continued)

*Primary Examiner*—Albert Decady
*Assistant Examiner*—Esaw Abraham
(74) *Attorney, Agent, or Firm*—Roger Burleigh

(57) ABSTRACT

The invention concerns the bit error resilience of an IP protocol stack based on a secure link layer, in which packet flows are header compressed according to a suitable header compression standard. By analyzing each packet at the link layer, it can be determined whether the packet is a full header packet, in which case the link layer checksum evaluation is used as normal for discarding faulty full header packets, or a header compressed packet, in which case the link layer checksum evaluation is ignored and the packet is propagated upwards in the protocol stack. This solution not only allows for more intelligent higher-level handling of faulty header compressed packets, but also solves the problem of properly protecting full header packets at the link layer. In order to compensate for ignoring the link layer checksum evaluation for header compressed packets, header protection is introduced at the header compression level of the link layer by using one or more local checksums. The invention is particularly applicable to delay-sensitive real-time data such as compressed voice or video.

42 Claims, 10 Drawing Sheets

OTHER PUBLICATIONS

M. Degermark, et al., Internet Engineering Task Force (IETF) RFC 2507, "IP Header compression", Feb. 1999, http://www.cis.ohio-state.edu/rfc/.rfc2507.txt.

S. Casner, et al., Internet Engineering Task Force (IETF) RFC 2508, "Compressing IP/UDP/RTP Headers for Low-Speed Serial Links", Feb. 1999, http://www.cis.ohio-state.edu/rfc/.rfc2508.txt.

L. Oarzon et al., "Efficient Use of Wireless Bandwidth for Multimedia Applications", 1999 IEEE, Swedish Institute of Computer Science, Stockholm, Sweden.

L. Jonsson, et al. Internet Engineering Task For (IETF) Network Working Group Draft, "Robust Checksum-based Header Compression (ROCCO)", Jun. 15, 2000, http://search.ieft.org/internet-drafts/draft-ietf-rohc-rtp-rocco-01.txt.

* cited by examiner

BIT ERROR RESILIENCE FOR AN INTERNET PROTOCOL STACK

This application claims priority under 35 U.S.C. §§ 119 and/or 365 to 60/244,369 filed in United States of America on Oct. 30, 2000; the entire content of which is hereby incorporated by reference.

BACKGROUND

The present invention generally relates to the Internet Protocol (IP), and more particularly to improved bit error resilience for an IP protocol stack based on a secure link layer, as well as a method and system for protecting header information in header compressed packets.

The Internet Protocol (IP) is the underlying network layer protocol for routing packets on the Internet and other similar networks. The Internet Protocol is an internetwork protocol, and provides a means for communication across linked networks. The linked networks that form the overall internetwork are normally referred to as subnetworks. Whereas frames are used for transmitting data on subnetworks, so-called IP datagrams are the "envelopes" for transmitting data across the internetwork. In general discussions, frames as well as IP datagrams are often referred to as packets. As the IP datagrams cross a subnetwork, they are normally encapsulated in the frames of that subnetwork, and upon arrival to a router, the datagrams are extracted from the frames and repackaged into the frames of the next subnetwork.

The two main schemes that have been adopted by the Internet community to encapsulate and transmit IP datagrams, i.e. IP packets, over point-to-point links are the Serial Line Internet Protocol (SLIP) and the Point-to-Point Protocol (PPP). While SLIP is the original protocol, PPP is the predominant framing protocol since it also works with other protocols such as the Internetworking Packet Exchange (IPX) protocol. For example, PPP is commonly used together with the High-level Data Link Control (HDLC) Protocol, and often for Internet connections over dial-up lines where PPP links are established between users and service providers.

Applications for IP-based networks generally access the network resources through two interfaces, the Transmission Control Protocol (TCP) and the User Datagram Protocol (UDP). Both of these protocols reside in the transport layer between the applications on the application layer and the Internet Protocol on the network layer. While TCP is a connection-oriented protocol with features for providing reliable delivery of data, UDP is a connectionless protocol without the reliability present in TCP. UDP gives applications a direct interface to the Internet Protocol and the ability to address a particular application process running on a host without establishing a connection session, as is required by TCP. In many cases, when an entire transmission can be effectuated in just a few UDP packets, UDP provides for much more efficient communication compared to TCP. Establishing a TCP connection session would just take too much time in proportion to the data to be sent. In addition, applications and protocols designed for delivering delay-sensitive real-time data such as voice or video typically use UDP as their transport layer protocol. If a packet of voice or video is lost, retransmission is usually not practical since the retransmitted information would be out of synchronization with the current data. Consequently, for delay-sensitive real-time data, the acknowledgment-and-retransmission services offered by TCP has low practical value, and instead UDP is utilized.

To improve transmission efficiency in general, and for PPP links of low and medium speed in particular, different techniques for compressing the headers of IP/UDP and IP/TCP packets have been devised. For example, RFC 2507 and RFC 2508 of the Internet Engineering Task Force (IETF) specify Internet standards on IP header compression applicable to IPv4 headers and IPv6 base and extension headers, TCP and UDP headers, as well as encapsulated IPv4 and IPv6 headers. In particular, RFC 2507 and RFC 2508 The IETF RFC 2507 and RFC 2508 are hereby incorporated by reference.

Header compression reduces the negative impacts of large IP headers significantly, and allows efficient bandwidth utilization. Among other things, header compression reduces header overhead, and thus less bandwidth is required for the headers. It also reduces the packet loss rate for any given bit error rate, because fewer bits are sent per packet compared to full header packets.

The key feature that allows efficient header compression is that in a packet flow most header fields are identical in consecutive packets. For simplicity one may think of a packet flow as all the packets sent from a particular source address and port to a particular destination address and port using the same transport protocol. A basic principle for compressing the headers of a packet flow is to send a packet with a fall header and establish an association between the non-changing fields of the full header and a context identifier (CID), a small unique number also carried by compressed headers. The association between the non-changing fields and the context identifier is typically implemented in a header compression table in which the non-changing fields of the full header are stored as a compression state. The CID identifiers in the compressed headers of subsequent packets are used to find the corresponding compression state in the header compression table to use for decompression. Any change in a header field that is not expected to change will cause the compressor to send a new full header to update the compression state for the packet flow. In addition to the CID identifiers, the compressed headers may also include incremental changes to various header parameters.

In order to alleviate the problem of incorrect decompression, full headers are typically sent occasionally to refresh the compression state, and according to IETF RFC 2507 each new version of the compression state for a given CID is identified by a generation number. In RFC 2507, a generation number is carried by each full header that refreshes a compression state, and the compressed headers carry the generation number of the compression state that was used for compressing the headers. When the decompressor finds that a compressed header carries a generation number other than the generation number of the compression state for that packet flow, the compression state is out of date and the header compressed packet must be discarded or stored until a new full header establishes a correct compression state.

In RFC 2508, the problem of incorrect decompression is solved by a sequence counter and peer signaling.

FIG. 1 illustrates a full UDP header with CID and generation association as well as a corresponding compressed header based on the CID and generation fields according to RFC 2507. The gray fields of the full header are stored as the compression state. The UDP checksum is normally included in the compressed header as a safety precaution.

Without header compression, a bit error only affects the packet actually containing the bit error. However, when header compression is applied and a bit error occurs in a full header, a single bit error may cause the loss of a large number of subsequent header compressed packets. This is because the bit error will propagate into all subsequent compressed headers that are expanded using the compression state established by the faulty full header. If the link layer protocol utilizes a strong checksum, such bit error propagation is prevented because frames with bit errors will be discarded before they reach the decompressor. As noted in the article *Low-loss TCP/IP header compression for wireless networks* by Degermark et al., Wireless Networks 3 (1997), pp. 375–387, this generally means that IP header compression requires the use of a secure link layer protocol with a strong checksum.

The bit-error resilience, also referred to as bit-error tolerance, of an ordinary IP protocol stack (IPv4 or IPv6) is normally based on a secure link layer protocol such as the High-level Data Link Control (HDLC) protocol. FIG. 2 is a schematic overview of a UDP/IP protocol stack based on a HDLC link layer. In this example, IP header compression in the header compression (HC) sublevel of the link layer is used for improving the transmission efficiency of the link. FIG. 2 also illustrates the existing checksums in a UDP/IP stack.

The standardized secure link layer protocols of today generally have a simple error detection mechanism with a checksum that covers the entire frame. As can be seen in FIG. 3, which illustrates the different headers of the UDP/IP protocol stack of FIG. 2 and the coverage of the existing checksums in more detail. The HDLC protocol normally has a 16 or 32 bit checksum that covers the entire HDLC frame except for the start and stop flags. If a bit error occurs anywhere in the frame part covered by the HDLC checksum, the corresponding packet will simply be discarded at the receiving end when the checksum error is detected. The other available checksums, on the UDP level and for the IPv4 header, would be redundant in this case. They are only used for extra protection to guarantee that the application packet reaches its correct destination.

However, for many IP-based applications, especially those involving delay-sensitive real-time data, such as voice or video, the checksum error detection mechanism of the secure link layer is not particularly appropriate and generally leads to severe degradations of the application quality. In particular, for lossy links with high bit error rates (BER), such as radio or microwave links, or even low quality copper cables, far too many packets will be discarded because of the strong checksum error detection of the link layer protocol. On the other hand, header compression techniques used for improving the transmission efficiency, especially for links of low and medium speed, strongly require the use of a secure link layer.

In view of the above conflicting requirements on the link layer, there seems to be a general need to devise a new strategy for improved bit error resilience, especially for low and medium speed links with relatively high bit error rates.

RELATED ART

U.S. Pat. No. 5,535,199 of Jul. 9, 1996 relates to TCP/IP header compression X.25 networks. The patent discloses a method and apparatus for negotiating the use of the so-called van Jacobsen header compression/decompression scheme between remote nodes in a TCP/IP/X.25 network, as well as a method for implementing the use of the Van Jacobsen header compression/decompression scheme in such a network. A specific Protocol Identifier (PID) in a user data field of a call request packet is used for indicating that the terminal issuing the call request will use TCP/IP header compression. The terminal receiving the call request will then either return a call accept message or a call reject message depending on whether that terminal can use TCP/IP header compression.

The international application WO 99/04522 published on Jan. 28, 1999 relates to a system for adaptive loss-less compression of cell/packet headers in an ATM network. On the sending side, the system discriminates cells/packets, detects headers, compresses headers and combines compressed headers and payloads. On the receiving side, the system discriminates header-compressed cells/packets, separates compressed headers from payload, decompresses the headers and combines the decompressed headers with payload to form cells/packets.

The international application WO 00/42743 published on Jul. 20, 2000 relates to a method for transmitting information in data transmission flows between communication devices, and presents a mechanism for enhancing packet transmission in such a way as to avoid unnecessary fragmentation, while at the same time achieving as small a delay as possible in the transmission of packets that require real-time data transmission. The proposed mechanism is based on a real-time packaging principle of the suspend/resume type, in which part of the header information is transferred to be transmitted at the end of a packet after the information part of the packet.

The international application WO 95/30282 published on Nov. 9, 1995 relates to a digital radio communication system incorporating bad frame detection. In order to have an early warning of an upcoming bad frame, error detection on a time-slot-by-time-slot basis is proposed. The error detection mechanism utilizes a signal that is present in each time slot in both the forward and reverse links, namely the Coded Digital Verification Color Code (CDVCC). The CDVCC is a 12-bit coded version of the 8-bit DVCC and the redundancy of the 12-bit coded version is utilized by a Hamming error correction algorithm to detect the occurrence of a bit error in the decoded DVCC. An error detected in the DVCC means that the corresponding frame is also corrupted, and hence a bad frame can be detected on a time-slot-by-time-slot basis before the complete frame has been received.

SUMMARY

It is a general object of the present invention to improve the bit error resilience for an IP protocol stack that is based on a secure link layer.

In particular it is desirable to devise a new bit error resilience strategy that can resolve the conflicting requirements put on the link layer protocol by delay-sensitive real-time data in high bit error rate environments on one hand and the use of header compression on the other hand.

It is another object of the invention to improve the application quality, such as the speech quality, for IP-based real-time applications.

Yet another object of the invention is to provide a mechanism for protecting header information in header compressed packets.

These and other objects are met by the invention as defined by the accompanying patent claims.

The invention is based on the recognition that for IP-based applications, such as compressed voice or video, in which the payload is built up of parameters that have different levels of importance for the final application quality, it is interesting to propagate packets with bit errors in the less important parameters upwards in the IP stack for use in the application as long as the more important parameters are correct. The basic problem of secure link layers such as the HDLC link layer is that any frame with an error indicated by the link layer checksum is normally discarded. This makes it impossible to distinguish between errors in higher protocol headers, errors in important application parameters or errors in less important application parameters. Packets with errors in less important application parameters should be allowed to propagate upwards in the IP stack at least up to the UDP level, perhaps all the way up to the application level. Packets with errors in the higher protocol headers or in critical application parameters should be discarded unless the errors can be corrected by an error-correcting scheme.

Briefly, the basic idea according to the invention is to make the secure link layer unsecure for header compressed packets, and forward header compressed packets upwards in the IP stack for higher-level error evaluation, also referred to as higher-level error protection in a more general sense. This opens up for more intelligent handling of faulty packets, compared to just discarding them at the link layer. For example, if it can be determined at the UDP level or by an application specific protocol that a bit-error in a packet only affects a less important application parameter, that packet can probably be used by the application without seriously degrading the application quality. Also, if the application specific protocol has error correcting capabilities, a bit error in a critical parameter can be corrected so that the corresponding packet can be used. This will lead to considerable improvements of the application quality, and interesting applications in this regard are compressed voice, compressed video or other applications with similar requirements on bit error resilience.

Preferably, all packets are analyzed at the link layer to determine whether the packets are header compressed, and the secure link layer is made unsecure by ignoring or overriding the link layer checksum evaluation and forwarding the header compressed packets upwards in the protocol stack. Of course, it is not necessary to forward header compressed packets with correct link layer checksums to a higher protocol level for further error evaluation. Therefore, in an optimized implementation, only header compressed packets with faulty link layer checksums are propagated upwards in the IP stack for higher level error evaluation.

By overriding the link layer checksum evaluation for header compressed packets and propagating them to higher protocol levels, while keeping the checksum evaluation for full header packets, the full headers can still be protected properly at the link layer to ensure that a correct full header will be entered into the header compression table. This is extremely important since the compression state of the full header will be used to replace compressed headers for all packets until a new full header is received.

Although application-specific parameters are handled more intelligently at a higher protocol level, it is clearly advantageous to compensate for ignoring the link layer checksum for header compressed packets by also protecting header information on the header compression (HC) level of the link layer. According to the invention, this is basically solved by elegantly introducing one or more local checksums for protecting specific parts of the compressed header. The basic idea according to this aspect of the invention is to select a first subset of the compressed header as a local checksum, and protect a second subset of the compressed header by the selected local checksum. For example, the local checksum can be selected as a predetermined portion of the Context Identifier (CID) field to protect the PPP Protocol Identifier (PID) field and possibly also the CID field, or as a predetermined portion of the Generation field to protect the rest of the Generation field. By defining a number of such local checksums, and using the fact that higher level checksums, such as the UDP checksum, protect themselves, virtually all fields of the compressed header can be protected on the Header Compression level.

The invention offers the following advantages:
Improved bit error resilience;
More intelligent handling of faulty header compressed packets, while at the same time providing complete protection against incorrect full header packets; and
Improved application quality, especially for compressed voice and video.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
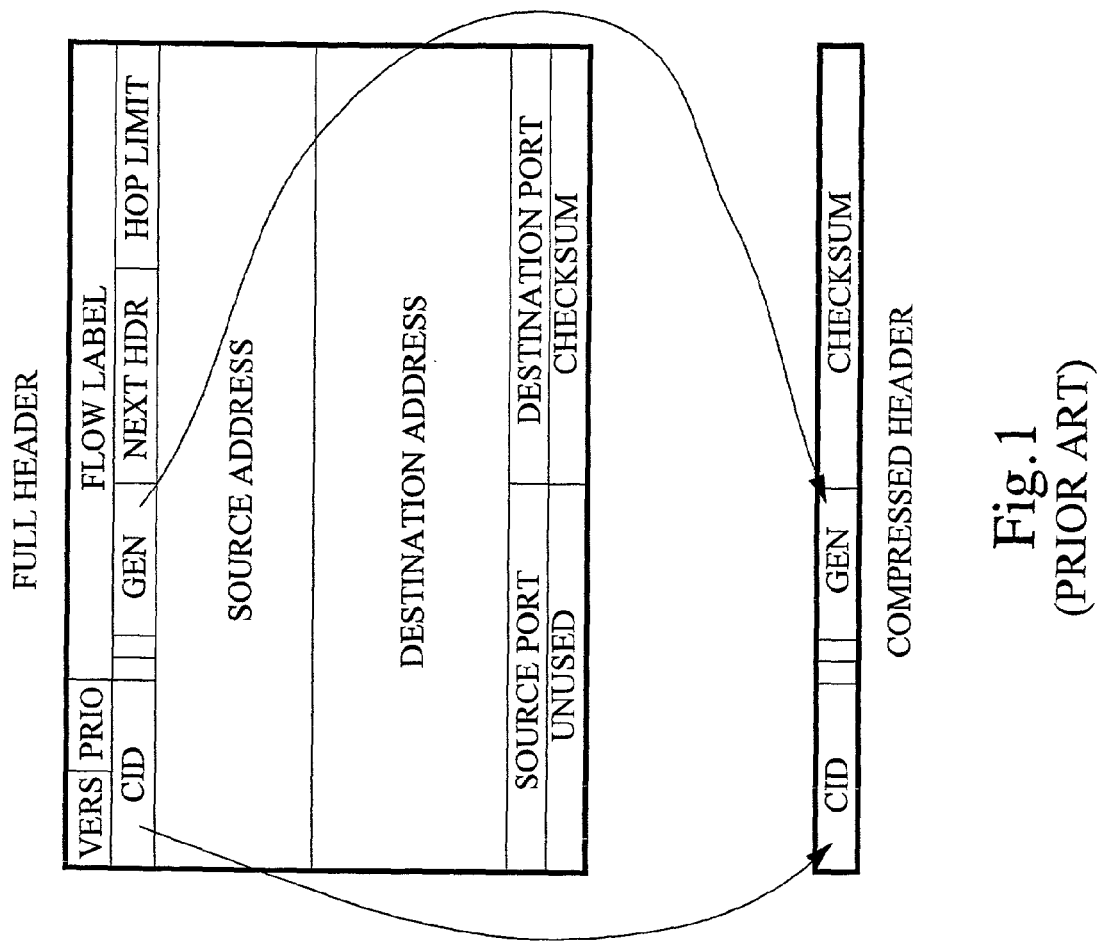
FIG. 1 illustrates a full UDP header with CID and generation association as well as a corresponding compressed header based on the CID and generation fields.
Figure 2:
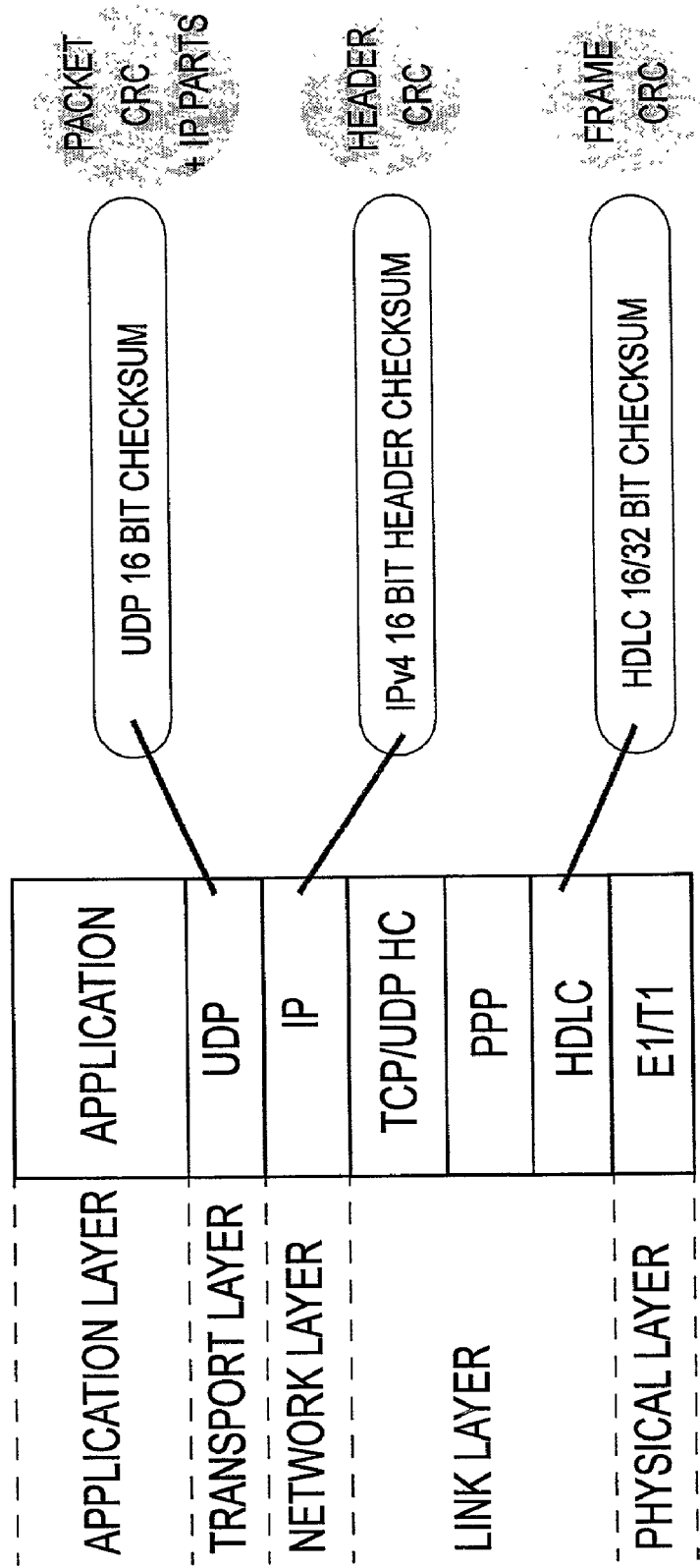
FIG. 2 is a schematic overview of a UDP/IP protocol stack based on a HDLC link layer.
Figure 3:
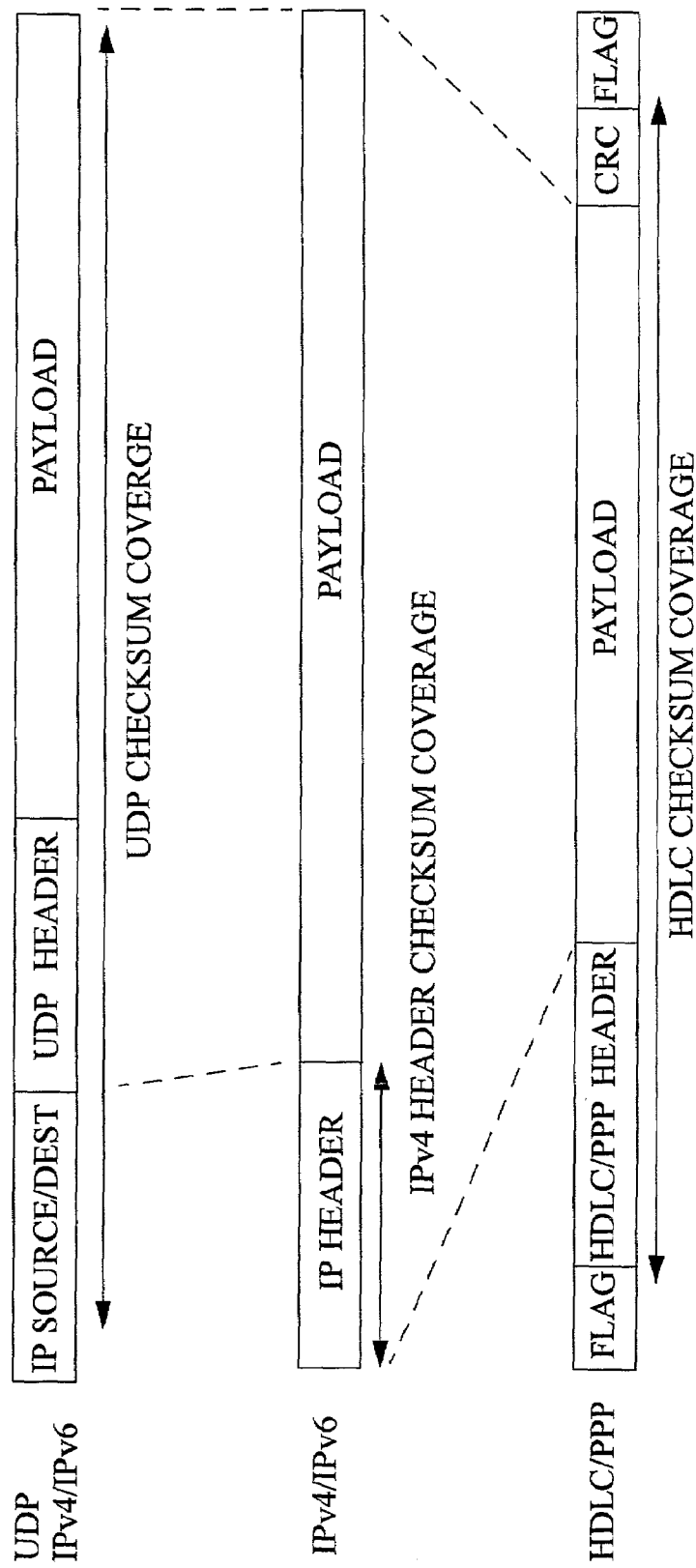
FIG. 3 illustrates the different headers of the UDP/IP protocol stack of FIG. 2 and the coverage of the existing checksums in more detail.

Throughout the drawings, the same reference characters will be used for corresponding or similar elements.

For a better understanding, the invention will now be described with reference to a particular example in which an IP protocol stack is running applications over a PPP/HDLC-based link layer. More specifically, in the following example it is assumed that the application is a delay-sensitive real-time application such as voice or video, and that the packet flows are transported using the UDP transport layer protocol. In order to improve the transmission efficiency, especially for links of low and medium speed such as radio or microwave links, the packets are header compressed using a suitable header compression technique (for example RFC 2507, RFC 2508, ROCCO or ROCH).

Reference Overview

Figure 4:
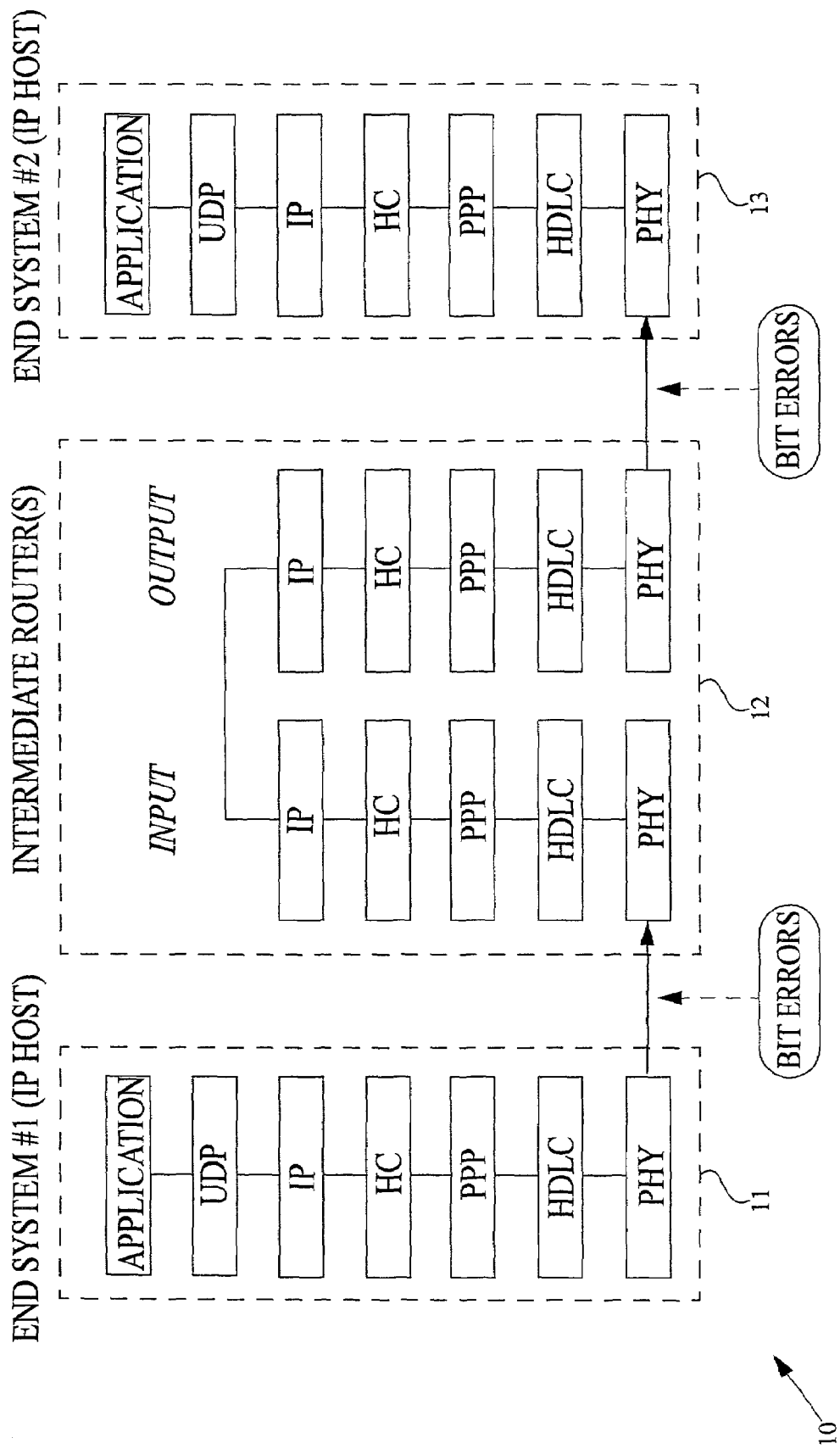
FIG. 4 is a schematic drawing of a simple network from the protocol stack viewpoint.

FIG. 4 is a schematic drawing of a simple network from the protocol stack viewpoint. The network 10 comprises a first end system (IP host) 11 connected via conventional communication links with varying bit error rates and a selectable number of intermediate routers 12 to a second end system (IP host) 13. The application payload is encapsulated in UDP/IP packets and sent over the PPP/HDLC-based links. The protocol stacks are processed by conventional processing systems in the hosts and routers. In this example, the UDP protocol and the application protocol are processed only in the end systems 11 and 13.

Bit Error Resilience for Improved Application Quality and Secure Header Compression The HDLC-checksum is calculated for all packets and sent over the respective PPP/HDLC-based link, but the checksum evaluation on the receiving side is ignored for header compressed packets. This means that header compressed packets are forwarded upwards in the IP stack for higher-level error protection. Preferably, the packets will finally be propagated at least up to the UDP level where they can be handled by an error protection scheme that is more intelligent than the checksum evaluation of the secure link layer. On the other hand, errors in full header packets are detected already at the link layer level in order to ensure that a correct full header will be entered into the header compression table.

Therefore, all packets are analyzed at said secure link layer to determine whether the packets are header compressed or not. Preferably, this is determined at the PPP layer by analyzing the PPP Protocol Identifier (PID) byte to determine the type of payload in the PPP packet. Table I below illustrates the PID values for different types of packets, and also whether or not a faulty HDLC checksum should be used to discard a packet based on the corresponding PID value.

Table I

| Protocol Header Type | PID value (hex) | Discard packet on CRC error |
|---|---|---|
| RFC 2507/2508 Full header | 0061 | Yes |
| RFC 2507 compressed non-TCP header | 0065 | No |
| RFC 2508 compressed UDP 8-bit CID header | 0067 | No |
| RFC 2508 compressed UDP 16-bit CID header | 2067 | No |
| Rocco-all headers | 1 value, TBD | No |
| All other protocol headers | — | Yes |

Thus, by analyzing the PPP PID it can be determined whether the packet is a full header packet in which case the HDLC checksum evaluation is used as normal for discarding faulty full header packets, or a header compressed packet in which case the HDLC checksum evaluation is ignored and the packet is propagated upwards in the protocol stack. It should though be understood that Table I is not exhaustive, and that other protocol header types such as the ROHC (RObust Header Compression) header and other upcoming header types can be included therein.

This solution not only opens up for more intelligent higher-level handling of faulty header compressed packets, but also solves the problem of properly protecting full header packets at the link layer. This latter aspect of the invention is very important since the compression state of the full header will be used to replace compressed headers for all packets until a new full header is received. In the case of IPv6, which has no IPv6 header checksum, the verified full header becomes even more important.

As will be understood by a skilled person, header compressed packets with correct HDLC checksums do not necessarily have to be subjected to further higher-level error evaluation, since it has already been determined at the link layer that the entire packet is free of bit-errors. It is thus possible to minimize the higher level error evaluation load, and forward only header compressed packets with faulty HDLC checksums upwards in the IP stack for higher level error evaluation. However, for robustness and simplicity it is normally assumed that all header compressed packets will be forwarded upwards in the stack for higher level evaluation.

For more information on PPP/HDLC link layer protocol, reference is made to IETF RFC 1662, which is hereby incorporated by reference.

Figure 5:
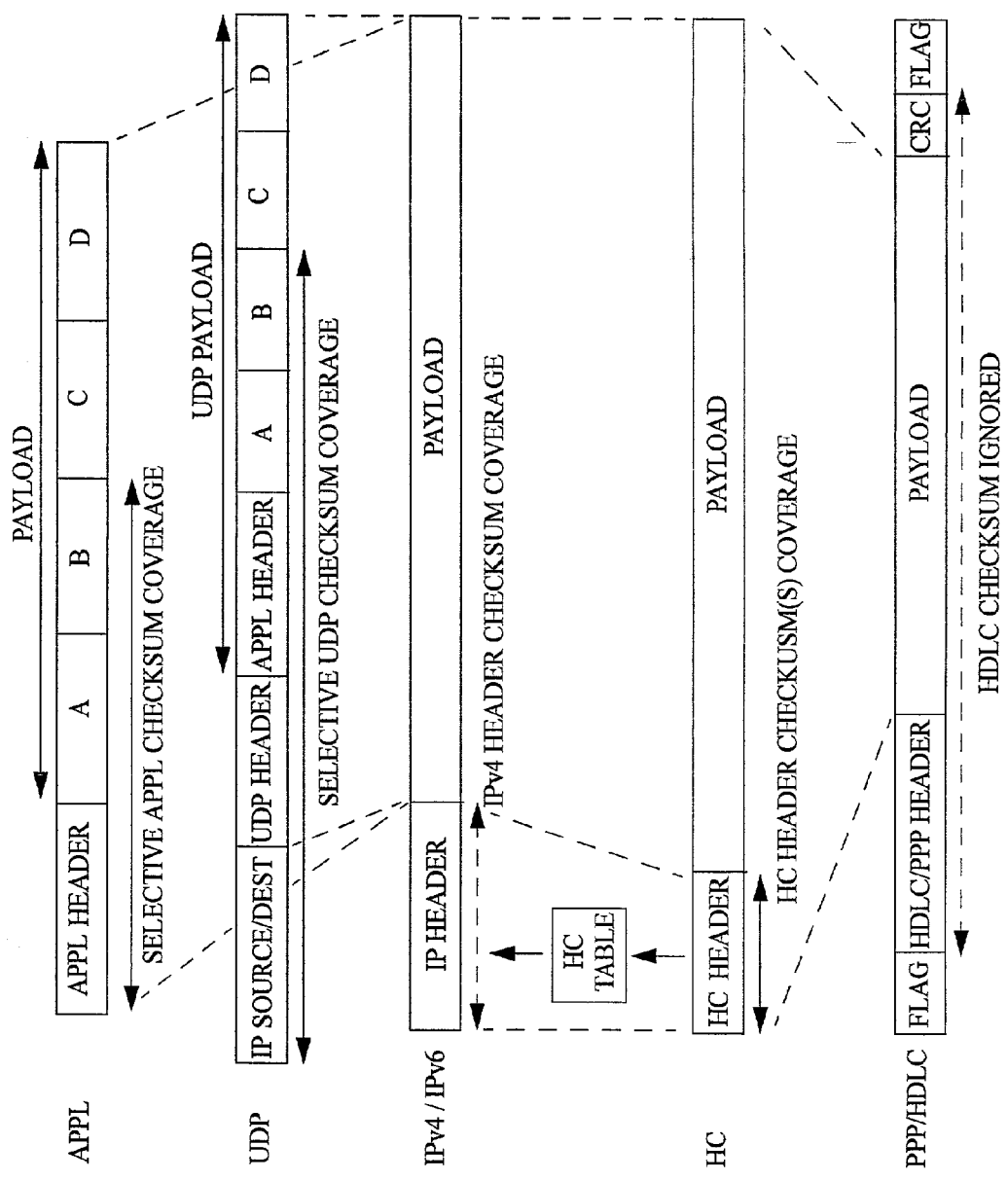
FIG. 5 is a schematic overview of a UDP/IP protocol stack based on a HDLC link layer, according to a preferred embodiment of the invention.

FIG. 5 is a schematic overview of a UDP/IP protocol stack based on a HDLC link layer, according to a preferred embodiment of the invention. As indicated in FIG. 5, the HDLC checksum at the PPP/HDLC layer is ignored for header compressed packets. To compensate for ignoring the HDLC checksum, header protection is introduced at the Header Compression (HC) level, and an error protection scheme for the UDP layer and/or the application layer that is more intelligent than the HDLC checksum error evaluation is introduced for optimizing the use of the application information sent over the links. The header protection scheme for the HC level will be explained in detail later on.

As mentioned above, full header packets are fully protected by the HDLC checksum to ensure correct expansion of compressed headers into UDP/IP headers using the appropriate compression state stored in the HC table.

Header compressed packets for which the HDLC checksum evaluation at the link layer has been ignored are propagated upwards in the IP stack, and the compressed headers are expanded into corresponding IP headers using the HC table. According to a preferred embodiment of the invention, the UDP protocol and/or the application protocol are preferably configured with a selective error detection mechanism so that it can be determined whether a bit-error affects header information, important application parameters or less important application parameters. If it can be determined that the header information and the more important application parameters of a packet are unaffected by bit errors, that packet can probably be used by the application without seriously degrading the application quality.

Compressed voice for example involves voice packets that are built up of voice codec parameters of different levels of importance for the final speech quality. In FIG. 5, such parameters are denoted by A, B, C and D. For convenience, the parameters are typically sorted in descending priority with the most important parameter first in order to make the selective protection easier. By using a selective error evaluation scheme, with a checksum that covers header information and appropriate parts of the payload A, B, an error in less important codec parameters C, D are allowed to propagate to the application while an error in more important codec parameters A, B will lead to the corresponding packet being discarded unless the error can be corrected by an error correcting scheme. Considerable improvements of the speech quality can be obtained by not discarding header compressed packets with faulty link layer checksums, and instead propagating the packets upwards in the IP stack where the important voice codec parameters of at least some of the packets can be used. In the case of error correction, which requires more error protection bits, an even higher percentage of the packets can be utilized in the application.

Figure 6A:
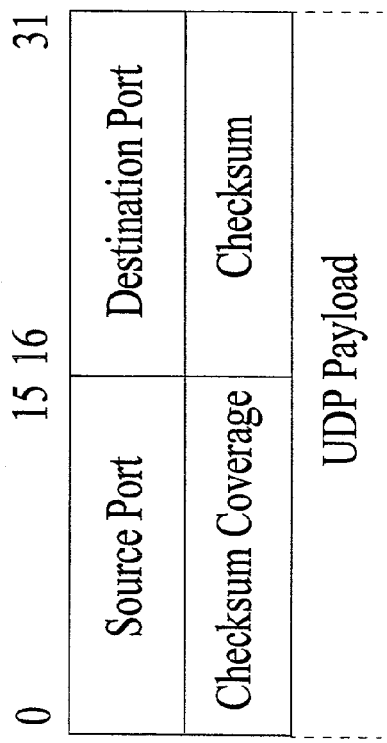
FIG. 6A illustrates the UDP Lite header format.
Figure 6B:
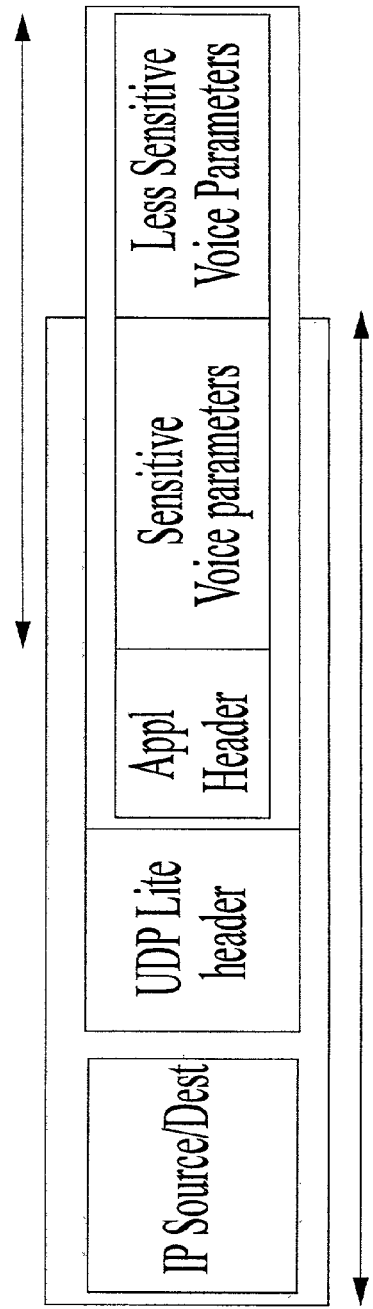
FIG. 6B illustrates a UDP Lite packet with a selective checksum.

For example, the so-called UDP Lite protocol can be used for selective error detection at the UDP Layer. FIG. 6A illustrates the UDP Lite header format, and FIG. 6B illustrates a UDP Lite packet with a selective checksum. The protocol size is the same as for the ordinary UDP header, but the length field is replaced by a Checksum Coverage field, stating how many bytes that should be covered by the 16-bit checksum, starting with the first byte in UDP Lite header. As for the ordinary UDP checksum, the Source and Destination IP address is included in the checksum calculation. This format enables protection of a selectable part (the first part) of the payload, which is useful if the packets are sorted with the most important parameters in the first part of the packet.

A solution where the UDP header is omitted, and the application is sent directly over IP (often referred to as 'raw' IP) is also possible. In that case, a corresponding selective checksum has to be included in the application header.

In general, possible protection methods for the higher-level error protection may range from bit error detection algorithms, such as parity bits, checksums or more specifically CRCs to single bit or multiple bit error correction methods such as the Hamming algorithm.

With reference once again to FIG. 5, the IPv4 header checksum is evaluated for full header packets before establishing a new context in the HC table in order to make sure that earlier bit errors have not propagated to the present link on the IP level. In this way, the risk of high error magnification is reduced or even eliminated. Otherwise, a single bit error that has propagated into a full header on the IP level may result in a magnification of the error several hundred times. This mechanism can also be introduced for the transport layer, using UDP Lite or other selective checksum method to make sure that the packet will reach the correct destination. Checking the selective checksum before entering the UDP header into the HC table will also eliminate the error magnification.

Naturally, the invention is not limited to the above examples. Although the main targeted application is compressed voice or video, other applications with similar requirements on bit error resilience can benefit as well. Also, other link layer protocols than the PPP/HDLC protocol can be used for the secure link layer.

Figure 7:
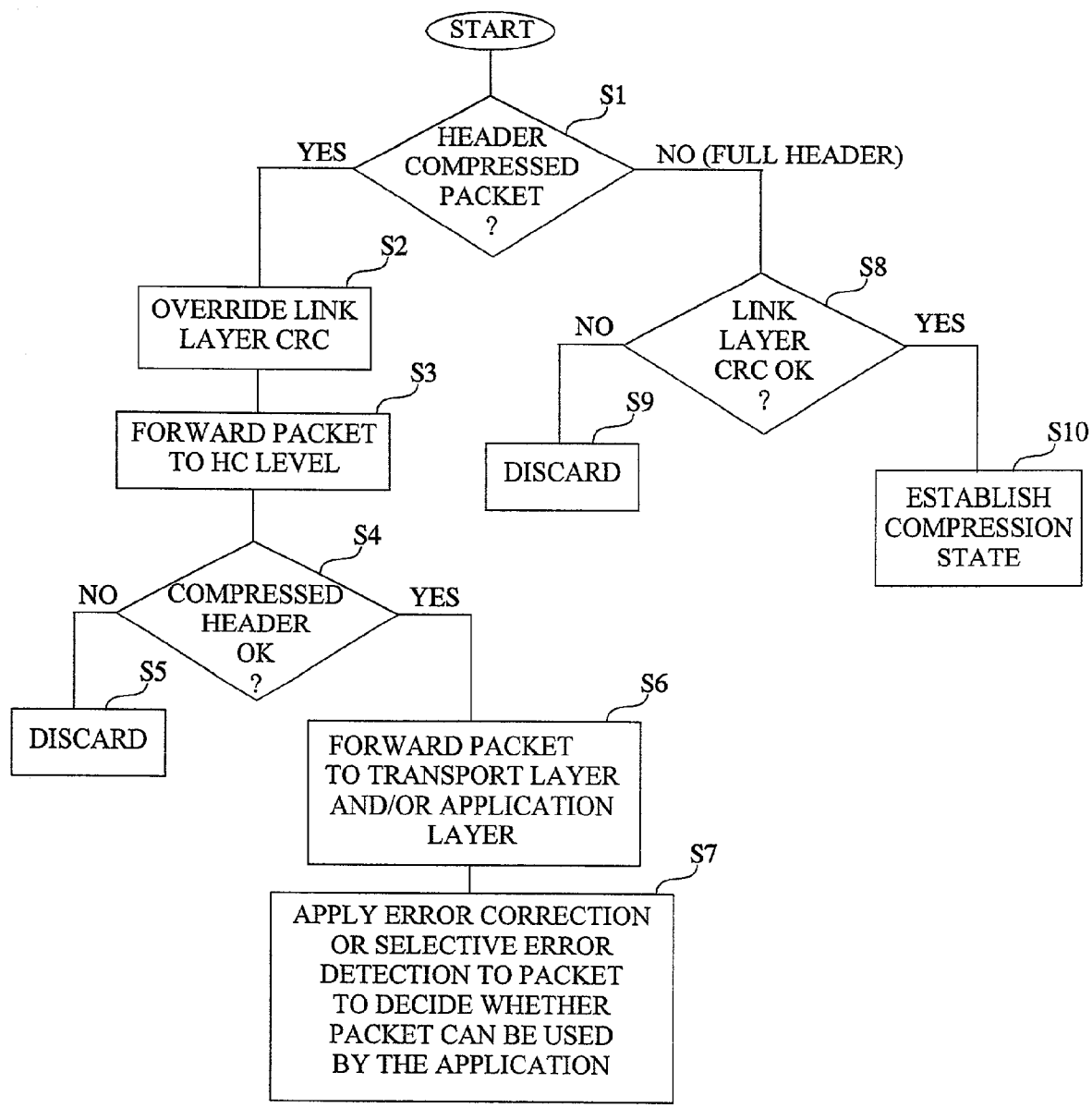
FIG. 7 is a schematic flow diagram summarizing the basic mechanism according to a preferred embodiment of the invention.
Figures 8A, 8B:
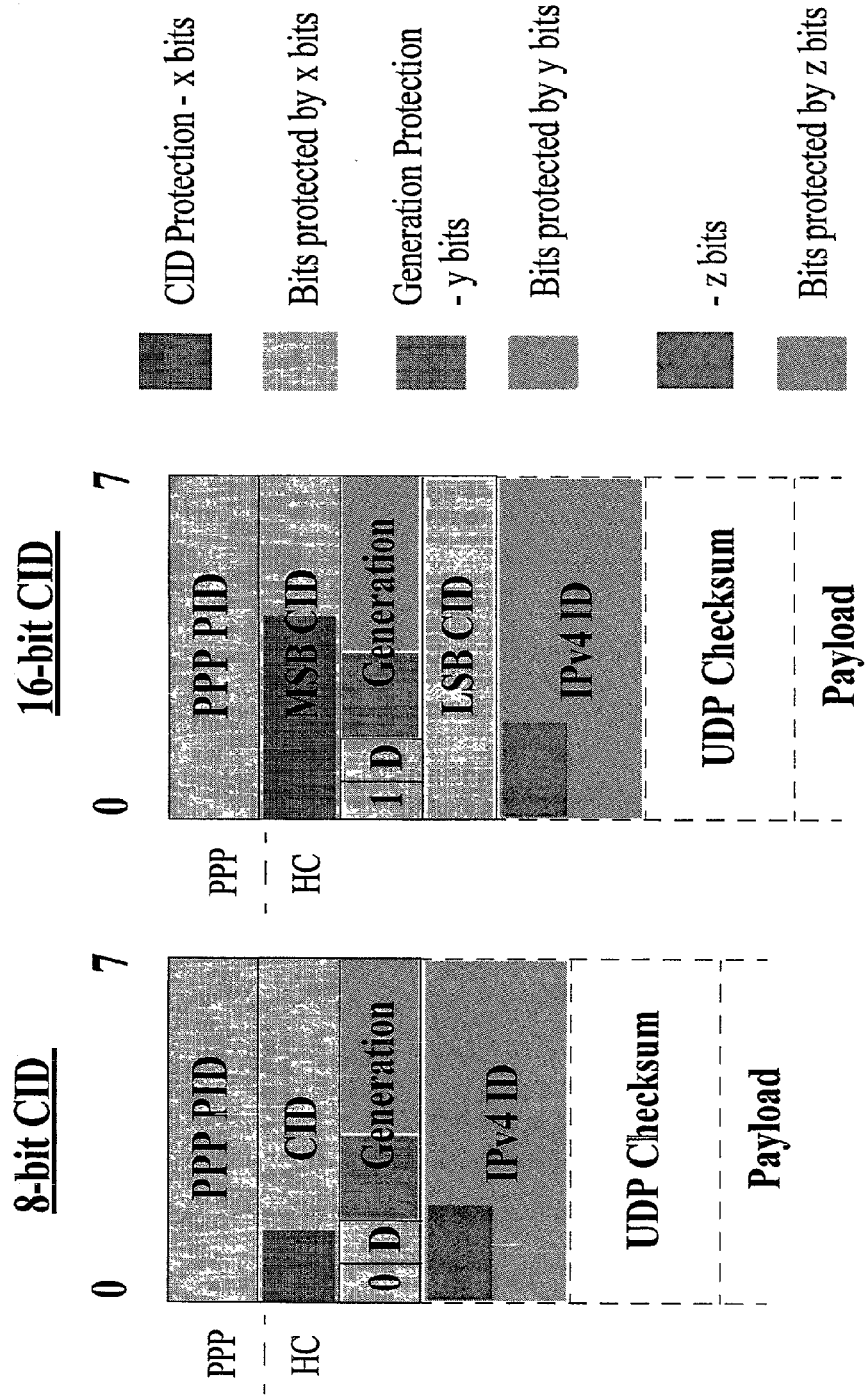
FIGS. 8A–B are schematic diagrams illustrating header compression protection for 8-bit and 16-bit CID format, respectively, for non-TCP headers compressed according to RFC 2507.
Figures 9A, 9B:
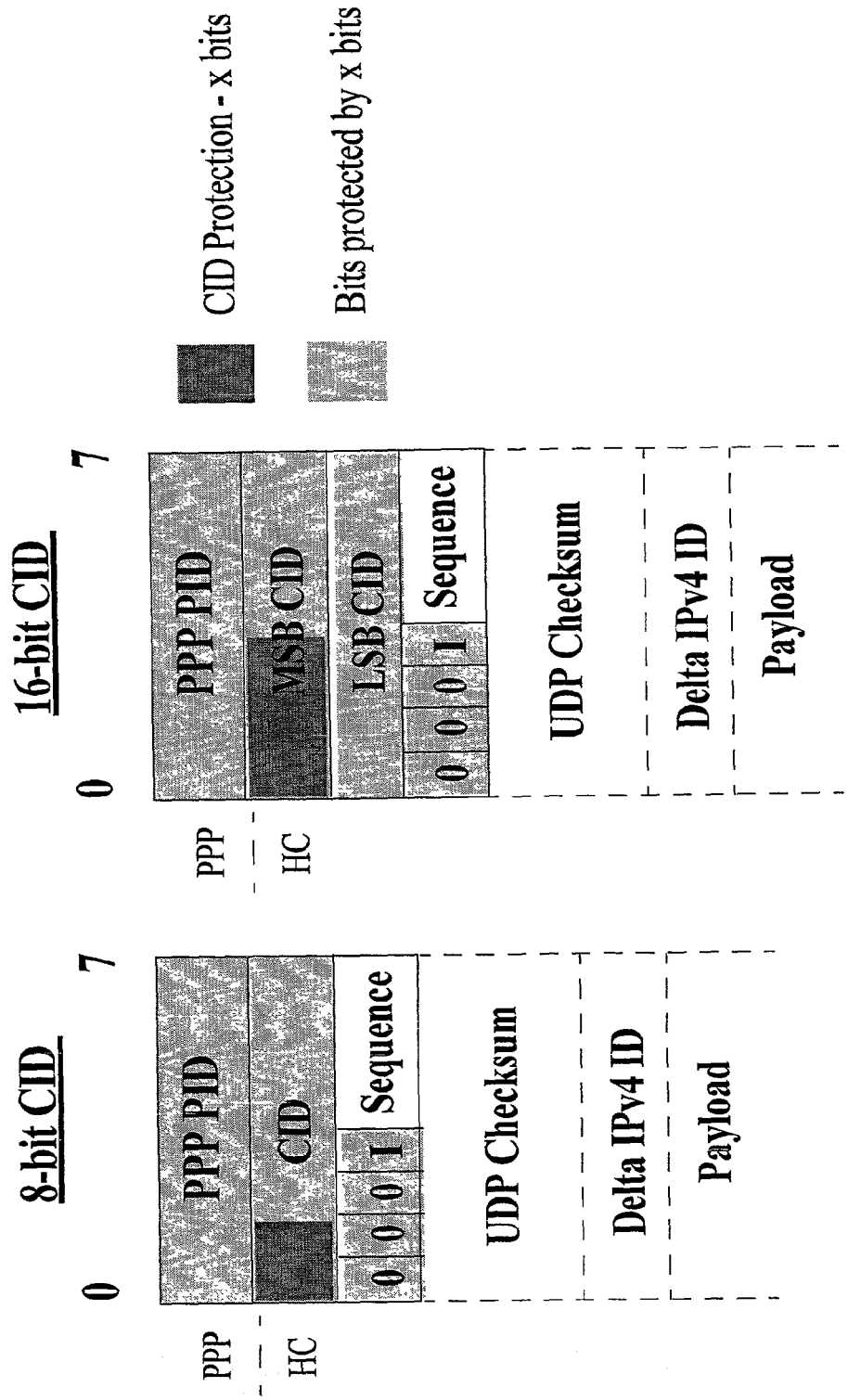
FIGS. 9A–B are schematic diagrams illustrating header compression protection for 8-bit and 16-bit CID format, respectively, for non-TCP headers compressed according to RFC 2508.

The basic mechanism according to a preferred embodiment of the invention will now be summarized with reference to the flow diagram of FIG. 7. In step S1 it is determined whether or not the packets are header compressed. Header compressed packets override the link layer CRC (step S2), and are forwarded to the HC level (step S3) for header error evaluation. In step S4, it is determined whether or not the compressed header is free of bit errors by means of one or more local checksums. If a bit error is detected in the compressed header, the packet is discarded in step S5. Otherwise, if the compressed header is OK, the packet is forwarded to the transport layer and/or the application layer in step S6. In step S7, a suitable error correction or selective error detection scheme is applied to the packet to decide whether the packet can be used by the application. For full header packets, it is determined in step S8 whether or not the link layer CRC is correct. If the full header packet is incorrect, the packet is discarded in step S9. Otherwise, a compression state and context is established in step S10.

Protecting Header Information of Header Compressed Packets

As briefly mentioned above, header information is protected on the HC level of the link layer in order to compensate for overriding the link layer checksum evaluation for header compressed packets. In the standardized header compression techniques, such as RFC 2507 and RFC 2508, there is no header protection at this level.

According to the invention, protection of a compressed header information is basically accomplished by elegantly introducing one or more local checksums for protecting specific parts of the compressed header. By defining a number of local checksums, and using the fact that higher level checksums, such as the UDP checksum, protect themselves, all fields of the compressed header can be protected on the HC level.

RFC 2507 Specific Solution

For the RFC 2507 header compression, we introduce a solution where x bits in the Header Compression CID field are used to protect the static part of the header compression fields, and y bits of the Generation field is used to protect the rest of the generation field.

The information to be protected by the x CID bits without violating the HC standard has to be static. Otherwise the CID bits used for protection will vary from packet to packet, making it impossible to use the scheme towards a peer node that does not use the proposed protection method. According to a preferred embodiment of the invention, the x CID bits protect the CID value itself and the bits indicating further header data ("D") and whether the CID is 8 bits or 16 bits ("0" and "1"), as well as the PPP Protocol Identifier (PID).

The generation value will change with each new version of the compression state, so it can not be protected with the x bits, not without changing the HC table at each new full header. Therefore, y bits in the generation field are used as parity bits for the rest of the generation bits. This will naturally reduce the number of possible generation values, but as long as the generation value is not repeated more often than every third second, the solution is still in compliance with the HC standard.

The UDP checksum protects itself, since a faulty checksum normally results in a dropped packet at the UDP layer. The IPv4 ID is assumed to be protected by using a well-defined sequence in the IPv4 ID, so that any out-of-order values can be detected as bit errors. Alternatively, if the end user is aware of the potential of errors in header compressed links along the IP route, the ID field is protected by always choosing z bits in the ID field to protect the rest of the 16 bits, in the same way as for the proposed CID protection.

RFC 2508 Specific Solution

For the RFC 2508 header compression, x bits in the Header Compression CID field are used to protect the static part of the header compression fields in the same way as for the above RFC 2507 solution.

The sequence counter protects itself, since any faulty sequence number will result in discarded packet, and a request for a new full header. The UDP checksum also protects itself, since a faulty checksum normally results in a dropped packet at the UDP layer.

The Delta value for the IPv4 ID is a bit more complicated to protect. According to a preferred embodiment of the invention, it is therefore assumed that the CID protection is used only when I=0. If the IP end system always use an increment of +1 for the IPv4 ID, this will be assumed as default when the context is setup by a full header, and no Delta IPv4 ID field will be required. However, if the increment deviates from normal, it is necessary to have a Delta value for the IPv4 ID to give information on the new incremental change of the IPv4 ID. In this case, the indicator I of a dynamic Delta value is set, i.e. I=1, and now the HDLC checksum should be used to detect any errors, and discard the packet if that is the case.

The above principles for protecting header information by one or more local checksums is generally applicable to any compressed header or combination of headers that includes static or quasi-static header information. Accordingly, the principles of the invention can be used not only in connection with the RFC 2507 and RFC 2508 IETF standards, but also together with other header compression techniques such as ROCCO (RObust Checksum-based header COmpression) and ROHC (RObust Header Compression), which presently are working group drafts under the IETF.

ROCCO Draft Specific Solution

Figures 10A, 10B:
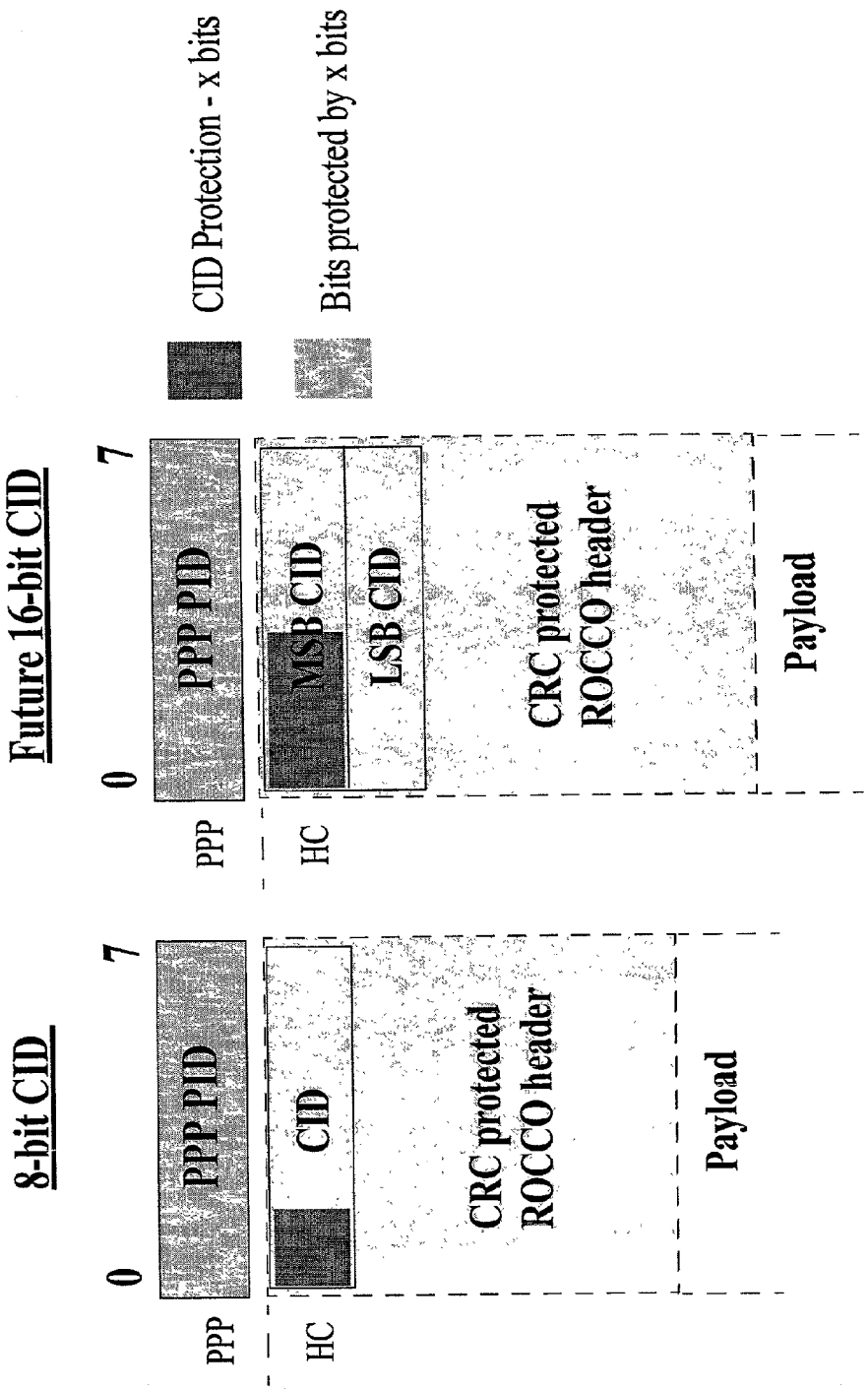
FIGS. 10A–B are schematic diagrams illustrating header compression protection for 8-bit and 16-bit CID format, respectively, for ROCCO headers.

The ROCCO header compression is a quite sophisticated algorithm originally developed to handle header compression over air interfaces with high bit error rates. With ROCCO, the header compression header as well as any full headers are already protected by a CRC inside the ROCCO header. The ROCCO header also protects the CID value if a multiple packet flow format is chosen. Today, only the 8-bit CID format is specified in the draft, and only for some of the possible headers formats. To be consistent with the other header compression formats, this invention also predicts the development of a 16-bit CID format in ROCCO. With reference to FIGS. 10A–B, the proposed addition to the existing ROCCO solution is to use x bits in the CID field to protect the PPP PID value only, since the CID values and the rest of the ROCCO header are already protected. One common PID value is used for all headers in the ROCCO algorithm.

As already mentioned, common general protection methods range from bit error detection algorithms to bit error correction methods, such as the Hamming algorithm. For example, in order to achieve a one-bit error correction for 21 bits using a Hamming algorithm, 5 parity bits would be needed. (Up to 11 bits could be corrected for one bit error with only 4 parity bits.) This should cover the PPP PID, the CID and the "1" and "D" bit in the second HC byte. If an error cannot be corrected, the packet should be discarded.

The embodiments described above are merely given as examples, and it should be understood that the present invention is not limited thereto. Further modifications, changes and improvements which retain the basic underlying principles disclosed and claimed herein are within the scope and spirit of the invention.

What is claimed is:

1. A bit error resilience method for an Internet Protocol (IP) stack based on a secure link layer having functionality for packet error detection, wherein said protocol stack resides within one physical node, said method comprising the steps of:
   analyzing packets at said secure link layer to determine whether the packets are header compressed; and
   forwarding at least header compressed packets with detected errors at said link layer upwards in the protocol stack for higher-level error protection.

2. The bit error resilience method according to claim 1, wherein said higher-level error protection includes subpacket error detection.

3. The bit error resilience method according to claim 1, wherein said higher-level error protection includes error correction.

4. The bit error resilience method according to claim 1, wherein all header compressed packets are forwarded upwards in said protocol stack for higher-level error protection.

5. The bit error resilience method according to claim 1, wherein said higher-level error protection includes the step of protecting header information in said header compressed packets on a higher sublevel of said link layer.

6. The bit error resilience method according to claim 5, wherein said higher sublevel is the Header Compression (HC) level.

7. The bit error resilience method according to claim 5, wherein said step of protecting header information in said header compressed packets includes the step of protecting at least part of the compressed header by a local checksum, wherein the local checksum is selected as a local subset of said compressed header.

8. The bit error resilience method according to claim 7, wherein said local checksum is a predetermined portion of a Context Identifier (CID) field in said compressed header.

9. The bit error resilience method according to claim 7, wherein said local checksum is a predetermined portion of a Generation field in said compressed header.

10. The bit error resilience method according to claim 7, wherein said local checksum is a predetermined portion of an IPv4 identifier field in said compressed header.

11. The bit error resilience method according to claim 7, wherein said protected compressed header information includes said local checksum.

12. The bit error resilience method according to claim 7, wherein said header compressed packets are header compressed according to one of the following standards:
   RFC 2507 of the Internet Engineering Task Force (IETF);
   RFC 2508 of the IETF; and
   Robust checksum-based header compression (ROCCO) of the IETF.

13. The bit error resilience method according claim 1, wherein said higher-level error protection includes the step of protecting header information and at least part of the payload in said packets on the User Datagram Protocol (UDP) level.

14. The bit error resilience method according to claim 13, wherein said packets include compressed real-time data and said higher-level error protection of at least part of the payload includes the step of protecting critical real-time parameters in the payload.

15. The bit error resilience method according to claim 1, wherein said higher-level error protection includes the step of protecting at least part of the payload in said packets on the application level.

16. The bit error resilience method According to claim 1, wherein said header compressed packets are header compressed according to one of the following standards:
   RFC 2507 of the Internet Engineering Task Force (IETF);
   RFC 2508 of the IETF; and
   Robust checksum-based header compression (ROCCO) of the IETF.

17. The bit error resilience method according to claim 1, further comprising the step of discarding a header compressed packet with a faulty link layer checksum if the indicator of a dynamic Delta value for an Internet Protocol version 4 (IPv4) identifier is set.

18. The bit error resilience method according to claim 1, further comprising the step of discarding full header packets with faulty link layer checksums.

19. The bit error resilience method according to claim 1, further comprising the step of discarding full header packets with faulty IPv4 checksums, thus protecting from bit error propagation on the Internet Protocol (IP) level.

20. The bit error resilience method according to claim 1, wherein the framing protocol of said secure link layer is the Point-to-Point Protocol (PPP).

21. The bit error resilience method according to claim 1, wherein said secure link layer is the High-level Data Link Control (HDLC) protocol layer.

22. A bit error resilience system for an Internet Protocol (IP) stack based on a secure link layer having means for checksum error evaluation, wherein said protocol stack resides within one physical node, said system comprising:
means for analyzing packets at said secure link layer to determine whether the packets are header compressed; and
means for forwarding at least header compressed packets with faulty link layer checksums upwards in said protocol stack for higher-level error protection.

23. The bit error resilience system according to claim 22, wherein said higher-level error protection includes sub-packet error detection.

24. The bit error resilience method according to claim 22, wherein said higher-level error protection includes error correction.

25. The bit error resilience system according to claim 22, wherein said forwarding means is operative for forwarding all header compressed packets upwards in the protocol stack for higher-level error protection.

26. The bit error resilience system according to claim 22, wherein said higher-level error protection is effectuated at least partly by means for protecting header information in said header compressed packets on a higher sublevel of said link layer.

27. The bit error resilience system according to claim 26, where in said higher sublevel is the Header Compression (HC) level.

28. The bit error resilience system according to claim 26, wherein said means for protecting header information in said header compressed packets includes means for protecting at least part of the compressed header by a local checksum, wherein the local checksum is selected as a local subset of said compressed header.

29. The bit error resilience system according to claim 28, wherein said local checksum is a predetermined portion of a Context Identifier (CID) field in said compressed header.

30. The bit error resilience system according to claim 28, wherein said local checksum is a predetermined portion of a Generation field in said compressed header.

31. The bit error resilience system according to claim 28, wherein said local checksum is a predetermined portion of an IPv4 identifier field in said compressed header.

32. The bit error resilience system according to claim 28, wherein said protected compressed header information includes said local checksum.

33. The bit error resilience system according to claim 28, wherein said header compressed packets are header compressed according to one of the following standards:
RFC 2507 of the Internet Engineering Task Force (IETF);
RFC 2508 of the IETF; and
Robust checksum-based header compression (ROCCO) of the IETF.

34. The bit error resilience system according to claim 22, wherein said higher-level error protection is effectuated at least partly by means for protecting header information and at least part of the payload in said packets on the User Datagram Protocol (UDP) level.

35. The bit error resilience system according to claim 34, wherein said packets include compressed real-time data and said higher-level error protection of at least part of the payload is effectuated by means for protecting critical real-time parameters in the payload.

36. The bit error resilience system according to claim 22, wherein said higher-level error protection is effectuated at least partly by means for protecting at least part of the payload in said packets on the application level.

37. The bit error resilience system according to claim 22, wherein said header compressed packets are header compressed according to one of the following standards:
RFC 2507 of the Internet Engineering Task Force (IETF);
RFC 2508 of the IETF; and
Robust checksum-based header compression (ROCCO) of the IETE.

38. The bit error resilience system according to claim 22, further comprising means for discarding a header compressed packet with a faulty link layer checksum if the indicator of a dynamic Delta value for an Internet Protocol version 4 (IPv4) identifier is set.

39. The bit error resilience system according to claim 22, further comprising means for discarding full header packets with faulty link layer checksums.

40. The bit error resilience system according to claim 22, further comprising means for discarding full header packets with faulty IPv4 checksums, thus protecting from bit error propagation on the Internet Protocol (IP) level.

41. The bit error resilience system according to claim 22, wherein the framing protocol of said secure link layer is the Point-to-Point Protocol (PPP).

42. The bit error resilience system according to claim 22, wherein said secure link layer is the High-level Data Link Control (HDLC) protocol layer.

* * * * *